US010171002B2

(12) United States Patent
Arimoto

(10) Patent No.: US 10,171,002 B2
(45) Date of Patent: Jan. 1, 2019

(54) SWITCHING POWER SUPPLY AND IMAGE FORMING APPARATUS

(71) Applicant: BROTHER KOGYO KABUSHIKI KAISHA, Nagoya-shi, Aichi-ken (JP)

(72) Inventor: Hideki Arimoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/920,659

(22) Filed: Mar. 14, 2018

(65) Prior Publication Data

US 2018/0269794 A1    Sep. 20, 2018

(30) Foreign Application Priority Data

Mar. 14, 2017    (JP) .................................. 2017-048172

(51) Int. Cl.
*H02M 1/36* (2007.01)
*H02M 3/335* (2006.01)
(Continued)

(52) U.S. Cl.
CPC .... *H02M 3/33569* (2013.01); *G03G 15/5004* (2013.01); *G03G 15/80* (2013.01);
(Continued)

(58) Field of Classification Search
CPC .................. H02M 1/36; H02M 3/335; H02M 2001/0032; H02M 2001/0041;
(Continued)

(56) References Cited

U.S. PATENT DOCUMENTS

2009/0129123 A1* 5/2009 Taurand ............ H02M 3/33576
363/17
2011/0292693 A1* 12/2011 Niijima ............. H02M 3/33507
363/21.17
(Continued)

FOREIGN PATENT DOCUMENTS

JP    2001-231252 A    8/2001
JP    2006-129547 A    5/2006
(Continued)

*Primary Examiner* — Gary L Laxton
(74) *Attorney, Agent, or Firm* — Merchant & Gould P.C.

(57) ABSTRACT

A switching power supply includes: a main power supply; a rectifying-and-smoothing circuit configured to rectify and smooth an AC voltage; a transformer connected to the rectifying-and-smoothing circuit; a first switching element connected to a primary coil of the transformer; a switch controller configured to perform switching-control the first switching element to oscillate the primary side of the transformer, thereby inducing a voltage to a secondary side of the transformer; and a second switching element connected in series with the smoothing capacitor of the rectifying-and-smoothing circuit and configured to switch between on-and-off states of energization by a control signal that is to be output from the switch controller, wherein the switch controller is configured to limit an on-time period of the second switching element by the control signal during an output stop mode in which the oscillation of the transformer is to be stopped.

12 Claims, 10 Drawing Sheets

(51) Int. Cl.
    *H02M 1/08*     (2006.01)
    *G03G 15/00*    (2006.01)
    *H02M 7/5375*   (2006.01)
    *H02M 1/00*     (2006.01)

(52) U.S. Cl.
    CPC ............... *H02M 1/08* (2013.01); *H02M 1/36* (2013.01); *H02M 2001/0032* (2013.01)

(58) Field of Classification Search
    CPC ..... H02M 2001/0048; H02M 3/33523; H02M 3/33569; H02M 7/537; H02M 7/53757; G03G 15/5004
    See application file for complete search history.

(56) References Cited

U.S. PATENT DOCUMENTS

2012/0113685 A1    5/2012  Inukai
2018/0083530 A1*   3/2018  Ueno ................... H02M 1/088

FOREIGN PATENT DOCUMENTS

JP      2006-246686 A    9/2006
JP      2012-105378 A    5/2012

* cited by examiner

SWITCHING POWER SUPPLY AND IMAGE FORMING APPARATUS

CROSS-REFERENCE TO RELATED APPLICATION

This application claims priority from Japanese Patent Application No. 2017-048172 filed on Mar. 14, 2017, the entire subject matter of which is incorporated herein by reference.

TECHNICAL FIELD

This disclosure relates to power consumption of a switching power supply and an image forming apparatus.

BACKGROUND

For example, the background art discloses a power supply system including a switching power supply. The power supply system disclosed in Patent Document 1 includes a switching power supply, and a control device configured to control the switching power supply. Also, the switching power supply includes a rectifying-and-smoothing circuit connected to an AC power supply, a transformer, a FET connected to a primary coil of the transformer, and a control IC. The control IC is configured to be activated as power is supplied thereto from the AC power supply. The control IC is configured to oscillate a primary side of the transformer and to induce a voltage to a secondary side of the transformer by switching the FET. The control device is configured to shift the switching power supply to an output stop mode by outputting a control pulse signal to the control IC and stopping the oscillation of the transformer during an output mode in which the transformer is oscillated and a voltage is supplied.

SUMMARY

However, according to the switching power supply, the voltage may be applied from the AC power supply to a smoothing capacitor of the rectifying-and-smoothing circuit not only during the output mode but also during the output stop mode. For this reason, during the output stop mode, the leak current is generated in the smoothing capacitor, so that the power may be unnecessarily consumed.

The technology of this disclosure to provide a switching power supply capable of suppressing the leak current, which is to be generated in a smoothing capacitor during oscillation stop of a transformer, and an image forming apparatus.

A switching power supply of this disclosure includes: a main power supply; a rectifying-and-smoothing circuit configured to rectify an AC voltage, which is supplied from the main power supply, and to smooth the rectified AC voltage by a smoothing capacitor; a transformer connected to the rectifying-and-smoothing circuit; a first switching element connected to a primary coil of the transformer; a switch controller configured to perform switching-control the first switching element to oscillate the primary side of the transformer, thereby inducing a voltage to a secondary side of the transformer; and a second switching element connected in series with the smoothing capacitor of the rectifying-and-smoothing circuit and configured to switch between on-and-off states of energization by a control signal that is to be output from the switch controller. The switch controller is configured to limit an on-time period of the second switching element by the control signal during an output stop mode in which the oscillation of the transformer is to be stopped.

According to the above configuration, the second switching element is connected in series with the smoothing capacitor of the rectifying-and-smoothing circuit. The second switching element is configured to switch between on-and-off states of energization by the control signal that is to be output from the switch controller. The switch controller is configured to limit the on-time period of the second switching element during the output stop mode in which the oscillation of the transformer is to be stopped. Herein, the description "limit the on-time period" means that the second switching element is to be turned off at least once during the output stop mode, for example. For this reason, the second switching element is temporarily turned off, consecutively turned off or continuously turned off during the output stop mode. The second switching element is turned off, so that at least one of the high voltage-side and the low voltage-side of the smoothing capacitor is disconnected. Thereby, during the output stop mode, the smoothing capacitor is not applied with a voltage from the main power supply, so that it is possible to suppress the generation of leak current and the power consumption.

According to the switching power supply and the like of this disclosure, it is possible to suppress the leak current, which is to be generated in the smoothing capacitor during the oscillation stop of the transformer.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment

Figure 1:
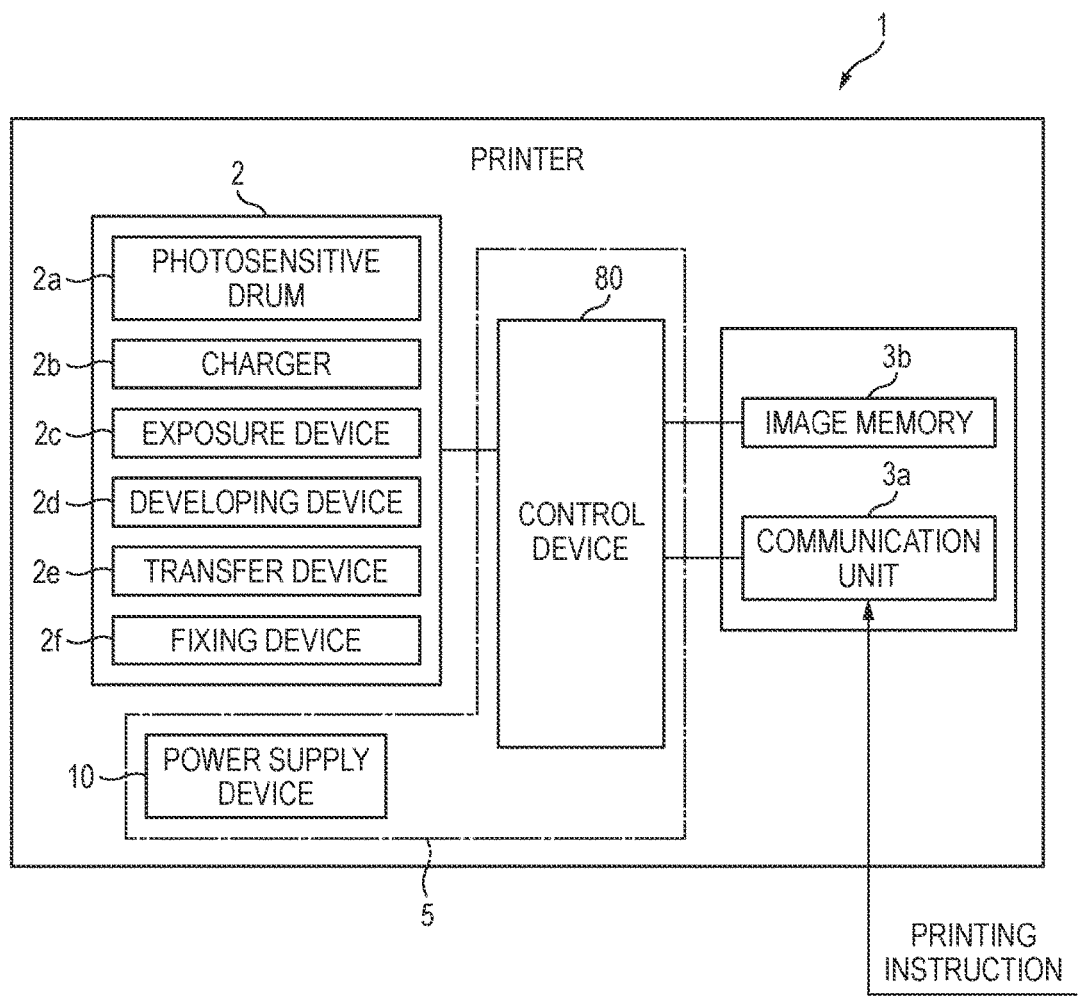
FIG. 1 is a block diagram depicting an electrical configuration of a printer of a first illustrative embodiment.

Hereinafter, a first illustrative embodiment of this disclosure will be described with reference to FIGS. 1 to 5.

1. Description of Printer

A printer 1 includes a printing unit 2, a communication unit 3a, an image memory 3b, and a power supply system 5.

The power supply system 5 includes a power supply device 10, and a control device 80. The power supply device 10 is configured to function as a power supply of the printer 1, and to supply power to the printing unit 2, the communication unit 3a, the image memory 3b and the control device 80. In the meantime, an operating voltage of the printing unit 2 is 24V, for example. An operating voltage of the communication unit 3a, the image memory 3b and the control device 80 is 3.3V, for example. The power supply device 10 is configured to supply the operating voltages to the printing unit 2, and the like The printing unit 2 includes a photosensitive drum 2a, a charger 2b, an exposure device 2c, a developing device 2d, a transfer device 2e, and a fixing device 2f. The charger 2b is configured to execute a charging process of charging a surface of the photosensitive drum 2a. The exposure device 2c is configured to execute an exposure process of forming an electrostatic latent image on the surface of the photosensitive drum 2a. The developing device 2d is configured to execute a developing process of attaching developer to the electrostatic latent image formed on the surface of the photosensitive drum 2a to form a developer image. The transfer device 2e is configured to execute a transfer process of transferring a developer image onto a sheet (a recording sheet, an OHP sheet or the like). The fixing device 2f is configured to execute a fixing process of fixing the developer image transferred onto the recording medium.

The printing unit 2 is configured to execute printing processing of executing the charging process, the exposure process, the developing process, the transfer process, and the fixing process to print printing data on the recording medium. The communication unit 3a is configured to perform communication with an information terminal apparatus such as a PC and the like, and to receive a printing instruction and printing data from the information terminal apparatus. The image memory 3b is configured to temporarily store the printing data received from the information terminal apparatus.

In the printer 1 having the above configuration, when the printing data is received from the information terminal apparatus to the communication unit 3a, the control device 80 executes the printing processing on the basis of the printing data. The control device 80 is configured to enable the printing unit 2 to execute the printing processing including the charging process, the exposure process, the developing process, the transfer process and the fixing process, thereby printing the printing data on the recording medium.

2. Description of Circuit of Power Supply System

The power supply device 10 includes a switching power supply 20, a DC-DC converter 35, and a DC-DC converter 45. The switching power supply 20 includes a rectifying-and-smoothing circuit 21, a transformer 23, a FET (field effect transistor) 25, a rectifying-and-smoothing circuit 27, a voltage detecting circuit 29, a control IC 50 configured to perform switching-control the FET 25, a FET 37, and a delay circuit 39.

The rectifying-and-smoothing circuit 21 is a so-called capacitor input type, and includes a bridge diode D1 configured to rectify an AC voltage (for example, 220V) of an AC power supply 15 (which is an example of the main power supply), and a smoothing capacitor C1 configured to smooth the rectified voltage. The transformer 23 is provided at an output-side of the rectifying-and-smoothing circuit 21. An input voltage Vin (for example, DC 311V) obtained by rectifying and smoothing the AC voltage by the bridge diode D1 and the smoothing capacitor C1 is applied to a primary coil N1 of the transformer 23 through an input line Lin.

The FET 25 is an N-channel MOSFET, for example, and a drain D thereof is connected to the primary coil N1 and a source S thereof is earthed. The FET 25 has a gate G connected to an output port OUT of the control IC 50, and a control signal Vp is applied from the output port OUT to the gate G. The control signal Vp is a pulse signal (PWM signal), for example. The control signal Vp is applied to the gate G, so that the FET 25 is turned on/off. Thereby, a primary side of the transformer 23 oscillates, so that a voltage is induced to a secondary coil N2 of the transformer 23.

Also, the FET 37 is an N-channel MOSFET, for example, and a drain D thereof is connected to the smoothing capacitor C1 and a source S thereof is earthed. The control signal Vp is applied from the control IC 50 to a gate G of the FET 37 via the delay circuit 39. The control signal Vp is applied to the gate G, so that the FET 37 is turned on/off. Thereby, during an output stop mode, which will be described later, the FET 37 is configured to disconnect connection between the smoothing capacitor C1 and the ground.

The delay circuit 39 includes resistance elements for delay Rd1, Rd2, a diode D6, and a delay capacitor Cd1. The delay resistance element Rd1 is connected at a high voltage-side with the output port OUT of the control IC 50 and is connected at a low voltage-side with the diode D6. The diode D6 is connected at a low voltage-side with the delay resistance element Rd2 and the delay capacitor Cd1 via a branch point J2. The delay resistance element Rd2 and the delay capacitor Cd1 are connected in parallel between the branch point J2 and the ground. In other words, the gate G of the FET 37 is connected to the branch point J2 between the diode D6 and the delay resistance element Rd2 (the delay capacitor Cd1). Thereby, the delay circuit 39 is configured to suppress amounts of change of increase and decrease of a gate voltage of the FET 37 and to delay the increase and the like, in correspondence to a time constant of an RC circuit configured by the resistance elements for delay Rd1, Rd2, and the delay capacitor Cd1.

Also, the primary side of the transformer 23 is provided with a voltage generating circuit 31. The voltage generating circuit 31 is configured to rectify and smooth a voltage, which is to be induced to an auxiliary circuit N3 provided to the primary side of the transformer 23, by a diode D2 and a capacitor C2. The voltage generating circuit 31 is connected to a power supply port VCC of the control IC 50 and is configured to function as a power supply of the control IC 50. The voltage generating circuit 31 is configured to supply a voltage of 20V to the control IC 50, for example.

The rectifying-and-smoothing circuit 27 is provided to the secondary side of transformer 23, and includes a diode D3 and a capacitor C3. The rectifying-and-smoothing circuit 27 is configured to rectify and smooth a voltage, which is to be induced to the secondary coil N2 of the transformer 23. Thereby, the switching power supply 20 is configured to output a voltage of DC 24V through an output line Lo1, for example.

Figure 2:
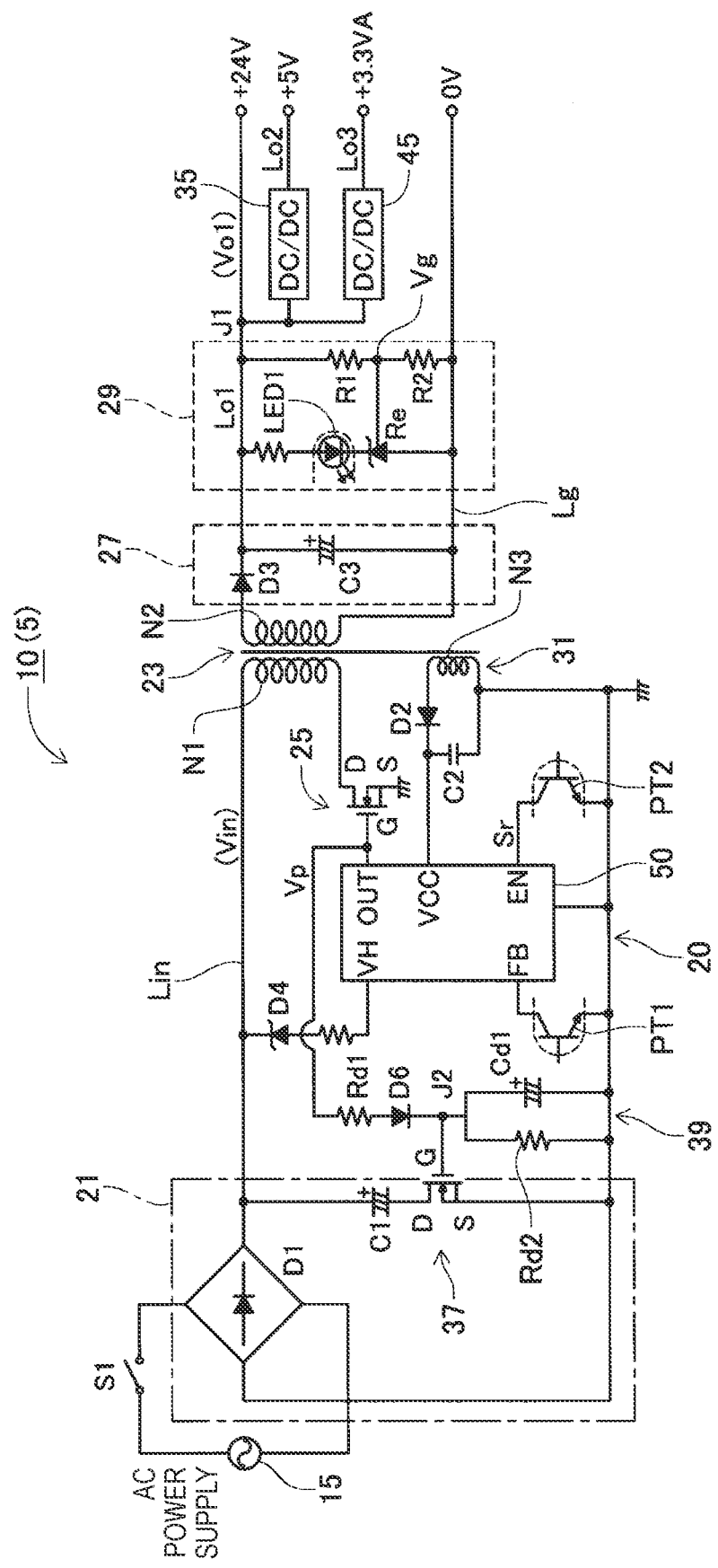
FIG. 2 is a circuit diagram of a power supply device of a power supply system.
Figure 3:
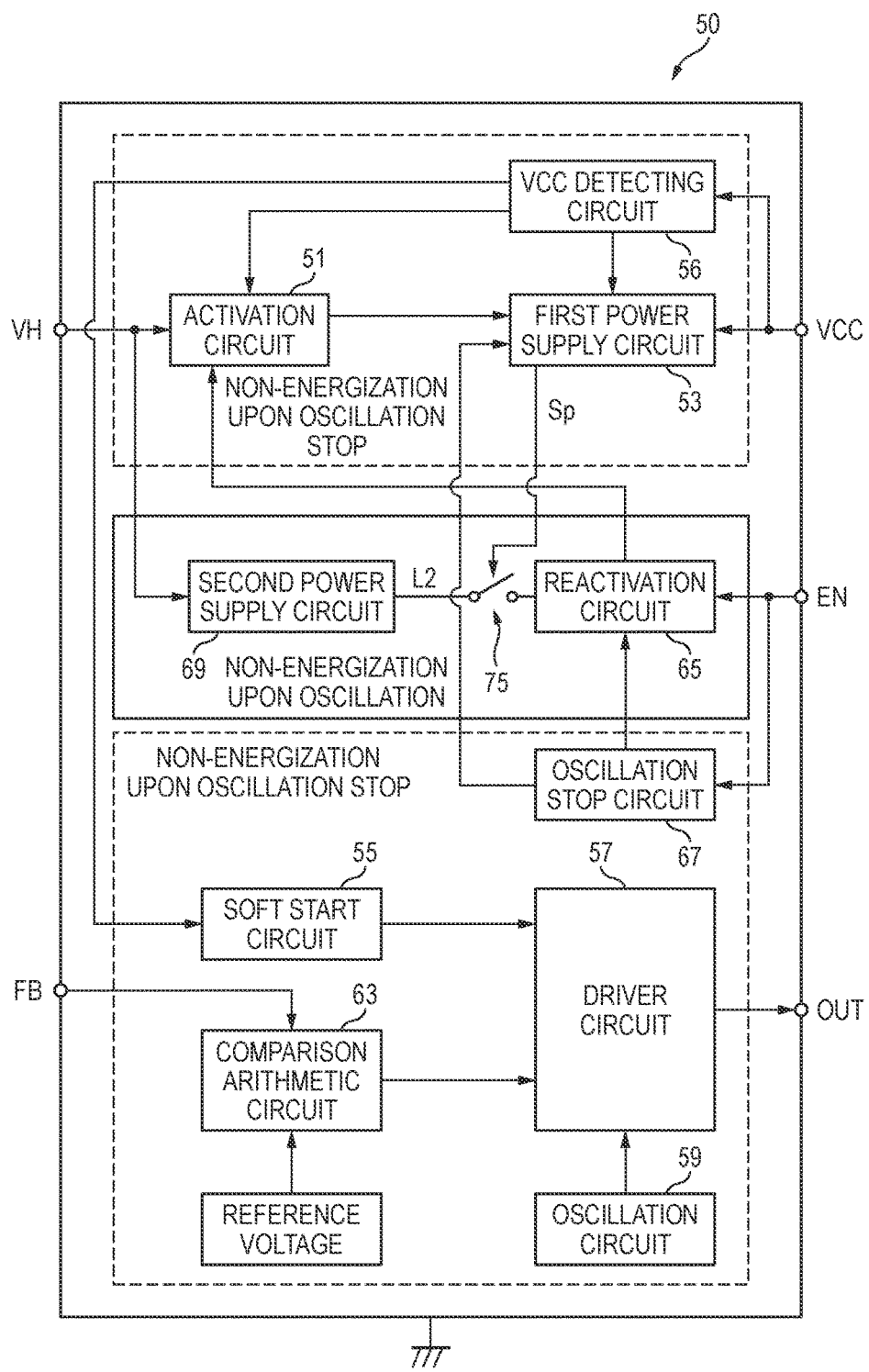
FIG. 3 is a block diagram of a control IC.

The output line Lo1 is branched at a branch point J1 shown in FIG. 2. The branched lines are provided with the DC-DC converters 35, 45, respectively. The DC-DC converter 35 is configured to lower an output voltage Vo1 of the switching power supply 20 to 5V and to output the same from an output line Lo2. Also, the DC-DC converter 45 is configured to lower the output voltage Vo1 of the switching power supply 20 to 3.3V and to output the same from an output line Lo3. In this way, the power supply device 10 is configured to output three voltages of 24V/5V/3.3V.

Also, the voltage detecting circuit 29 is provided between the rectifying-and-smoothing circuit 27 and the branch point J1 of the output line. The voltage detecting circuit 29 is configured to detect a level of the output voltage Vo1 (for example, DC 24V) of the switching power supply 20, and includes a pair of detection resistances R1, R2, a shunt regulator Re, and a light-emitting diode LED1 connected in series with the shunt regulator Re.

The detection resistances R1, R2 are connected between the output line Lo1 and a ground line Lg and is configured to generate a divided voltage Vg by dividing the output voltage Vo1 by a resistance ratio. The shunt regulator Re is configured to supply current corresponding to a level difference between a reference voltage in the shunt regulator Re and the divided voltage Vg. Thereby, the current is supplied to the light-emitting diode LED1, so that the light-emitting diode LED1 outputs a light signal having an amount of light corresponding to the level difference between the reference voltage and the divided voltage Vg.

The light-emitting diode LED1 configures a photo coupler together with a photo transistor PT1 connected to a feedback port FB of the control IC 50. The light signal of the light-emitting diode LED1 is converted into an electric signal by the photo transistor PT1. Thereby, a signal (hereinafter, referred to as 'feedback signal') indicating the level difference between the reference voltage of the shunt regulator Re and the divided voltage Vg is input (feed back) to the feedback port FB of the control IC 50.

Also, the control IC 50 includes five ports of the power supply port VCC connected to the voltage generating circuit 31, a high-voltage input port VH connected to an input line Lin via a diode (Zener diode) D4, the feedback port FB to which the feedback signal (the detection signal of the output voltage) is to be input, the output port OUT from which the control signal Vp (PWM signal for turning on/off the FETs 25, 37) is to be output, and a control input port EN to which a control pulse signal Sr to be output from the control device 80 is to be input.

The control IC 50 includes an activation circuit 51 connected to the high-voltage input port VH, a first power supply circuit 53, a soft start circuit 55, a VCC detecting circuit 56, a driver circuit 57 connected to the output port OUT, an oscillation circuit 59 configured to oscillate a triangular wave having a constant frequency, a comparison arithmetic circuit 63 connected to the feedback port FB, a reactivation circuit 65, an oscillation stop circuit 67, a second power supply circuit 69, and a prohibition circuit 75. In the meantime, the control input port EN is connected to input lines of the reactivation circuit 65 and the oscillation stop circuit 67. Thereby, the reactivation circuit 65 and the oscillation stop circuit 67 can be input with a signal (specifically, the control pulse signal Sr, which will be described later) to be input to the control input port EN.

The activation circuit 51 is configured to lower an input voltage, which is to be applied to the high-voltage input port VH, and to supply the same to the first power supply circuit 53. Also, the first power supply circuit 53 is configured to supply power to the other circuits 55, 56, 57, 59, 63, 67 except for the reactivation circuit 65 and the second power supply circuit 69. The first power supply circuit 53 is supplied with power from the activation circuit 51 to generate a power supply voltage of 5V and to supply the same to each of the circuits until the voltage of the power supply port VCC increases to a predetermined level immediately after the activation. After the power supply port VCC reaches the predetermined level, the first power supply circuit 53 is supplied with power from the voltage generating circuit 31 to generate a power supply voltage of 5V and to supply the same to each of the circuits 55, 56, 57, 59, 63, 67.

The soft start circuit 55 is configured to slowly increase an output of the switching power supply 20 upon the activation by increasing stepwise a duty ratio of the control signal Vp (PWM signal), which is to be applied to the gate G of the FET 25 through the driver circuit 57.

The comparison arithmetic circuit 63 is configured to compare a signal level of the feedback signal and a level of the reference voltage and to output a feedback signal to the driver circuit 57 in correspondence of an arithmetic result thereof.

The driver circuit 57 is configured to perform switching-control the FETs 25, 37 by outputting the control signal Vp (PWM signal) to the gates G of the FETs 25, 37. In the meantime, a PWM value of the control signal Vp is determined on the basis of the feedback signal input to the feedback port FB.

The oscillation stop circuit 67 is to interrupt the first power supply circuit 53, on condition that the control pulse signal Sr is input to the control input port EN during oscillation of the transformer 23 (during an output mode, which will be described later). In the meantime, the description "interrupt" means that the supply of the power from the voltage generating circuit 31 to the first power supply circuit 53 is interrupted to stop the first power supply circuit 53. By the interruption of the first power supply circuit 53, the supply of the power to each of the circuits 56, 57, 59, 63, 67 is stopped, and the driver circuit 57 stops the output thereof (the output port OUT becomes a high impedance). The oscillation of the transformer 23 is stopped.

Also, the reactivation circuit 65 is configured to output a reactivation signal to the activation circuit 51 and to reactivate the activation circuit 51, on condition that the control pulse signal Sr is input to the control input port EN while the first power supply circuit 53 is interrupted (during an output stop mode, which will be described later). The second power supply circuit 69 is a power supply of the reactivation circuit 65. The second power supply circuit 69 is connected to the high-voltage input port VH together with the activation circuit 51. The second power supply circuit 69 is configured to generate a power supply voltage of 5V by lowering a voltage, which is to be input from the high-voltage input port VH, and to supply the power to the reactivation circuit 65 through a power supply line L2.

Figure 4:
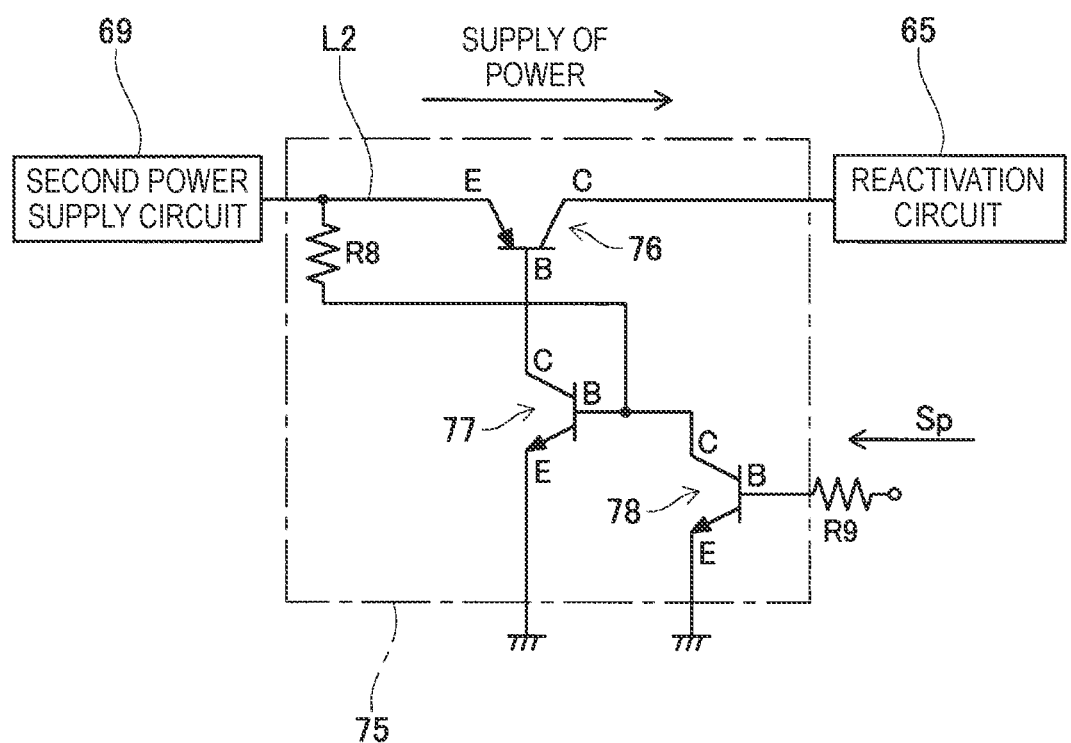
FIG. 4 is a circuit diagram of a prohibition circuit.

The prohibition circuit 75 is configured to prohibit the reactivation of the activation circuit 51 by the reactivation circuit 65 while the first power supply circuit 53 outputs an operating signal Sp of High level, and includes three transistors 76, 77, 78, as shown in FIG. 4. The transistor 76 is a PNP transistor. The transistor 76 is provided on the power supply line L2, and has an emitter E connected to the second power supply circuit 69 and a collector C connected to the reactivation circuit 65. The transistor 77 is an NPN transistor, and has a collector C connected to a base B of the transistor 76 and an emitter E connected to the ground. Also, a base B of the transistor 77 is connected to the power supply line L2 through a bias resistance R8.

The transistor 78 is an NPN transistor, and has a collector C connected to the base B (the bias resistance R8) of the transistor 77 and an emitter E connected to the ground. A base B of the transistor 78 is input with the operating signal Sp of High level, which is output from the first power supply circuit 53 (refer to FIG. 3), via a resistance R9.

When the operating signal Sp of High level is input to the base B of the transistor 78, the transistor 78 is turned on. The transistor 77 is turned off and the transistor 76 is turned off. For this reason, the power supply line L2 is opened (disconnected). On the other hand, when there is no input of the operating signal Sp, the on-and-off states of the respective transistors are reversed, so that the transistor 76 is turned on and the power supply line L2 is thus closed (connected).

The first power supply circuit 53 is configured to output the operating signal Sp to the prohibition circuit 75 during the oscillation of the transformer 23 (during an output mode, which will be described later). For this reason, during the oscillation of the transformer 23, since the power supply line L2 is in a non-energization state, the reactivation circuit 65 is not supplied with the power and is thus in a stop state. For this reason, during the oscillation of the transformer 23, it is possible to prohibit the reactivation of the activation circuit 51 by the reactivation circuit 65.

On the other hand, during the oscillation stop of the transformer 23 (during an output stop mode, which will be described later), the operating signal Sp is not output, so that the power supply line L2 is in an energization state. For this reason, the reactivation of the activation circuit 51 by the reactivation circuit 65 can be implemented.

The control device 80 includes a main block B1 configured to control the printing unit 2 of the printer 1, and a mode control block B2. A power supply port P1 of the main block B1 is connected to the output line Lo3 of the DC-DC converter 45 (refer to FIG. 1) and is supplied with the power from the switching power supply 20 via the DC-DC converter 45. In the meantime, the main block B1 is supplied with the power and is thus in an operation state only during the output mode (which will be described later). That is, when the switching power supply 20 shifts to the output stop mode (which will be described later), the main block B1 is not supplied with the power and is thus in the stop state.

In the meantime, a power supply port P2 of the mode control block B2 is connected to the DC-DC converter 35 (refer to FIG. 1) and is supplied with the power from the switching power supply 20 via the DC-DC converter 35. Specifically, a capacitor (an electric double layer capacitor for electric storage) C4 is connected to the output line Lo2 of the DC-DC converter 35 via the diode D4. The diode D4 is to prevent back current from the capacitor C4 toward the DC-DC converter 35.

A relay line L1 is connected to a connection point of the capacitor C4 and the diode D4. On the relay line L1, a DC-DC converter 83 is provided. The DC-DC converter 83 is configured to lower the output voltage of the DC-DC converter 35 to 3.3V, and to supply the same to the power supply port P2 of the mode control block B2. Therefore, during the output mode, the mode control block B2 is supplied with the power from the switching power supply 20 via the DC-DC converters 35, 83.

Also, during the output stop mode, the capacitor C4 becomes a power supply of the mode control block B2 and is supplied with the charging current from the DC-DC converter 35 through the output line Lo2.

Also, a control port P3 of the mode control block B2 is connected to a base B of a transistor 85. The transistor 85 has an emitter E connected to the ground and a collector C connected to a cathode of a light-emitting diode LED2.

The light-emitting diode LED2 has an anode connected to the relay line L1. The light-emitting diode LED2 configures a photo coupler together with a photo transistor PT2 connected to the control input port EN of the control IC 50. For this reason, when the control pulse signal Sr is output from the control port P3 of the mode control block B2 to the base B of the transistor 85, the control pulse signal Sr is optically transmitted via the photo coupler and is input to the control input port EN of the control IC 50.

The mode control block B2 is configured to switch the switching power supply 20 between the output mode and the output stop mode by outputting the control pulse signal Sr to the control IC 50. The output mode is a mode in which the primary side of the transformer 23 is oscillated to enable the switching power supply 20 to be in an output state. Also, the output stop mode is a mode in which the oscillation of the transformer 23 is stopped to stop the output of the switching power supply 20. Also, as the control pulse signal Sr, the same signal waveform is used for shift to the output mode and for shift to the output stop mode. For this reason, the mode control block B2 is set to output the control pulse signal Sr having a same pulse width from the control port P3 when shifting to the output mode and when shifting to the output stop mode.

Also, the mode control block B2 has a timer 90 embedded therein. The timer 90 is configured to measure elapse time from the mode change. During the output stop mode, the mode control block B2 is operated by the power supplied from the capacitor C4. Therefore, in case the output stop mode continues for a long time, the charged voltage of the capacitor C4 is lowered. As a result, it is not possible to keep the output voltage of the DC-DC converter 83 at 3.3V. For this reason, the time is measured by the timer 90 so that the mode control block B2 shifts the switching power supply 20 to the output mode to re-charge the capacitor C4 before the output voltage of the DC-DC converter 83 cannot be kept at 3.3V.

Figure 5:
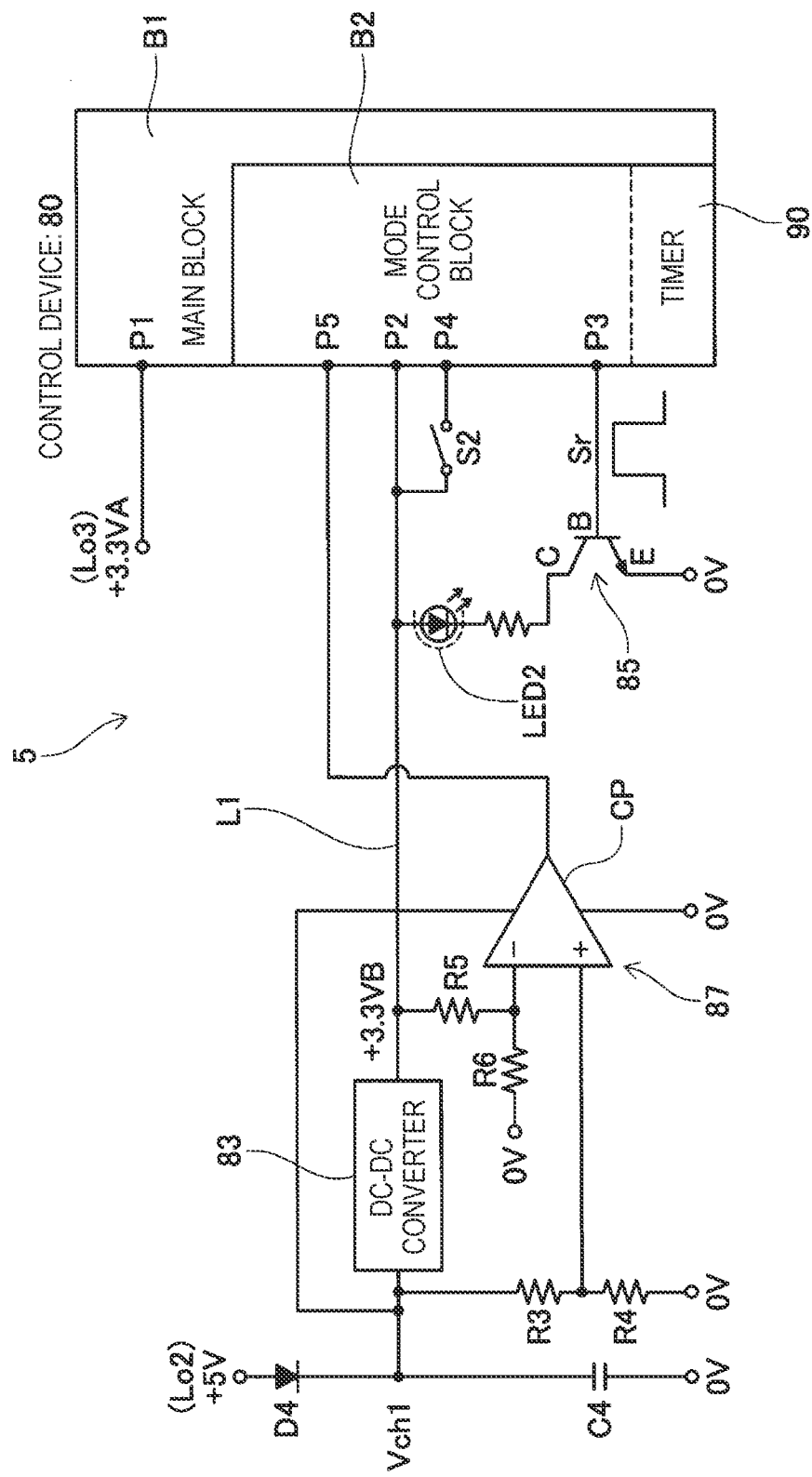
FIG. 5 is a circuit diagram of a control device-side of the power supply system.

Also, a detection circuit 87 shown in FIG. 5 is a detection circuit configured to detect a charged voltage Vch1 of the capacitor C4. The detection circuit 87 includes detection resistances R3, R4 for detecting the charged voltage Vch1 of the capacitor C4, a comparator CP configured to compare and output a voltage value detected by the detection resistances R3, R4 with a reference value, and voltage-dividing resistances R5, R6 for reference voltage.

When the charged voltage Vch1 is greater than the reference voltage, the comparator CP outputs a detection signal of High level to a port P5 of the mode control block B2. Also, when the charged voltage Vch1 is smaller than the reference voltage, the comparator CP outputs a detection signal of Low level to the port P5.

Also, even when a detection signal of Low level is input from the comparator CP, the mode control block B2 shifts the switching power supply 20 to the output mode, thereby re-charging the capacitor C4.

Also, a switch S2 shown in FIG. 5 is a mode changeover switch that is connected to a port P4 of the mode control block B2 and can be operated by a user. The mode control block B2 is configured to switch the mode, in correspondence to a user's operation on the switch S2.

3. Description of Operations of Power Supply System 5

3-1. Operation Upon Power-On of AC Power Supply

When a power supply switch S1 (refer to FIG. 2) connected to the AC power supply 15 is turned on, the input voltage Vin obtained by rectifying the AC voltage of the AC power supply 15 is input to the input line Lin of the switching power supply 20. At this state, the gate G of the FET 37 is supplied with a voltage of low level, so that the FET 37 is turned off. Also, since the power is supplied from the AC power supply 15 through the high-voltage input port VH, the activation circuit 51 and the second power supply circuit 69 of the control IC 50 are activated.

After the activation, the activation circuit 51 lowers and outputs the input voltage Vin to the first power supply circuit 53. The first power supply circuit 53 generates the power supply voltage of 5V from the voltage applied from the activation circuit 51, and supplies the power to the other circuits 55, 56, 57, 59, 63, 67 except for the reactivation circuit 65.

When the power is supplied from the first power supply circuit 53 to each of the circuits 55, 56, 57, 59, 63, 67, the soft start circuit 55 is first operated. The soft start circuit 55 applies the control signal Vp (PWM signal) to the gate G of the FET 25 through the driver circuit 57. Thereby, since the FET 25 is repetitively turned on and off and the FET 37 is turned on, the primary side of the transformer 23 of the switching power supply 20 starts to oscillates, so that the voltage is induced to the secondary side of the transformer 23 (the oscillation start).

Then, the soft start circuit 55 stepwise increases the PWM value (the voltage value of the control signal Vp), so that the on-time of the FET 25 stepwise increases and the output of the switching power supply 20 slowly increases. Also, as the output of the switching power supply 20 increases, the output voltage Vcc of the voltage generating circuit 31 also increases.

The VCC detecting circuit 56 monitors the output voltage Vcc of the voltage generating circuit 31. When the output voltage Vcc exceeds the reference value, the VCC detecting circuit 56 applies a command to the first power supply circuit 53 to switch a supply source of the power from the activation circuit 51 to the voltage generating circuit 31. Thereby, after the output voltage Vcc of the voltage generating circuit 31 excesses the reference level, the first power supply circuit 53 is supplied with the power from the voltage generating circuit 31. Accompanied by this, the activation circuit 51 is stopped.

Also, when the output voltage Vcc of the voltage generating circuit 31 excesses the reference level, the VCC detecting circuit 56 stops the soft start circuit 55. After the soft start circuit 55 stops, the control is switched to the feedback control, so that the driver circuit 57 outputs the PWM on the basis of the feedback signal input to the feedback port FB. Thereby, the output of the switching power supply 20 is adjusted so that the output voltage Vo1, which is detected by the voltage detecting circuit 29, becomes a target voltage of 24V (the output mode).

During the output mode, the power is supplied to each component of the printer 1 by the power supply device 10. For example, the printing unit 2 is supplied with the power (for example, 24V) from the switching power supply 20 through the output line Lo1. The printer 1 becomes in a printable state, i.e., a state where a printing instruction is received from the information terminal apparatus such as a PC and the printing processing can be executed in correspondence to the printing instruction. Also, during the output mode, the capacitor C4 shown in FIG. 5 is supplied and charged with the charging current through the output line Lo1 and the diode D4 of the switching power supply 20.

3-2. Shift From Output Mode To Output Stop Mode

For example, in following cases (a) and (b), since the mode control block B2 of the control device 80 shifts to the output stop mode, it outputs the control pulse signal Sr to the transistor 85 shown in FIG. 5.

A case (a) where the switch S2 for mode changeover is operated during the output mode.

A case (b) where a standby state of the printer 1 continues for a predetermined time period.

The output control pulse signal Sr is optically transmitted via the photo coupler and is input to the control input port EN of the control IC 50.

Herein, during the output mode, the power supply line L2 shown in FIG. 4 is in the non-energization state (the opened state), and the reactivation circuit 65 is stopped. For this reason, the control pulse signal Sr input to the control input port EN is not received at the reactivation circuit 65 and is received only by the oscillation stop circuit 67. When the oscillation stop circuit 67 receives the control pulse signal Sr, it interrupts the first power supply circuit 53. Thereby, the supply of the power to each of the circuits 56, 57, 59, 63, 67 of which a supply source of the power is the first power supply circuit 53 is stopped.

The driver circuit 57 stops, and the output port OUT (the control signal Vp) becomes a low level (the high impedance). As a result, the oscillation of the primary side of the transformer 23 stops. For this reason, the switching power supply 20 shifts to the output stop mode in which the output stops.

During the output stop mode, the switching power supply 20 is in the output stop state, so that the supply of the power to the printing unit 2, the communication unit 3a, the image memory 3b and the main block B1 of the control device 80 is stopped. On the other hand, the mode control block B2 of the control device 80 is in the operation state because the power is supplied thereto from the capacitor C4.

The elapse time from the mode change is measured by the timer 90 provided in the mode control block B2. Also, during the output stop mode, since the operating signal Sp is not output from the first power supply circuit 53, the power supply line L2 is in the energization state (the closed state). The reactivation circuit 65 is supplied with the power from the second power supply circuit 69 and is in the operation state.

3-3. Shift From Output Stop Mode To Output Mode

In following cases (c) to (e), since the mode control block B2 of the control device 80 shifts to the output mode, it again outputs the control pulse signal Sr to the transistor 85.

A case (c) where the elapse time measured by the timer 90 reaches a set time.

A case (d) where the detection signal of Low level is output from the comparator CP to the port P5.

A case (e) where the changeover switch SW2 is operated during the output stop mode.

In the cases, the control pulse signal Sr is optically transmitted via the photo coupler and is input to the control input port EN of the control IC 50.

As described above, during the output stop mode, the power is not supplied to the oscillation stop circuit 67. On the other hand, the reactivation circuit 65 is supplied with the power from the second power supply circuit 69 and is thus in the operation state. For this reason, only the reactivation circuit 65 can receive the control pulse signal Sr input to the control input port EN. When the reactivation circuit 65 receives the control pulse signal Sr, it reactivates the activation circuit 51

Thereby, like the case where the AC power supply becomes on, the first power supply circuit 53 generates the power supply voltage of 5V from the voltage applied from the activation circuit 51, and supplies the power to each of the circuits 55, 56, 57, 59, 63, 67 of which a supply source of the power is the first power supply circuit 53. As a result, the soft start circuit 55 is operated to slowly increase the output of the switching power supply 20, and the switching power supply 20 again shifts to the output mode.

4. Description of FET 37 and Delay Circuit 39

Figure 6:
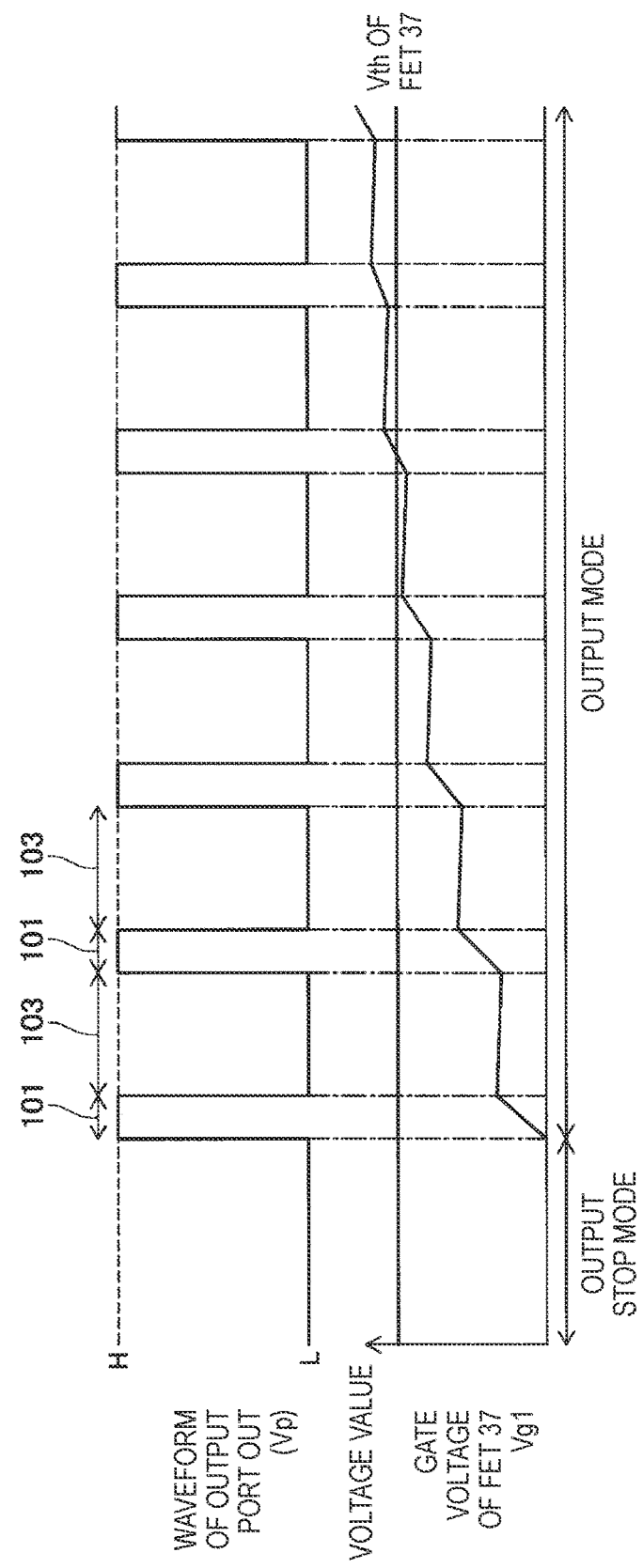
FIG. 6 is a waveform diagram depicting a relation between a control signal and a gate voltage.

In the meantime, FIG. 6 depicts a case where the soft start circuit 55 is not operated, i.e., the control signal Vp is not stepwise increased so as to easily understand the effects, which are to be accomplished by the FET 37. For this reason, the control signal Vp shown in FIG. 6 is a pulse signal that changes between a value of high levels of the same level and a value of low levels of the same level.

First, when the switching power supply shifts from the output mode to the output stop mode, the driver circuit 57 stops, and the output port OUT (the control signal Vp) becomes a low level (the high impedance). As a result, the switching of the FET 25 stops.

Also, the delay circuit 39 shown in FIG. 2 does not apply the voltage to the delay resistance element Rd1. The charges accumulated in the delay capacitor Cd1 during the output mode are restricted by the diode D6 and are discharged to the ground through the delay resistance element Rd2. For this reason, the gate voltage Vg1 of the FET 37 (the voltage value of the branch point J2) is decreased in correspondence to a time constant that is determined by an electrostatic capacity of the delay capacitor Cd1 and a resistance value of the delay resistance element Rd2. An amount of change of the decrease of the gate voltage Vg1 is similar to that during an off-time period 103 (refer to FIG. 6), which will be described later.

When the gate voltage Vg1 becomes a threshold Vth or smaller, the FET 37 is turned off. The smoothing capacitor C1 is disconnected at the connection to the ground. Therefore, the control IC 50 (the switch controller) of the first illustrative embodiment turns off the FET 37 (the second switching element) during the output stop mode in which the oscillation of the transformer 23 is stopped. Thereby, the smoothing capacitor C1 is not applied with the voltage from the AC power supply 15 (the main power supply), the generation of leak current is suppressed, and the power consumption is suppressed. In the meantime, during the output stop mode, the control IC 50 may be configured to temporarily turn off the FET 37, instead of completely turning off the FET 37, for example.

Then, when the switching power supply shifts from the output stop mode to the output mode, the gate voltage Vg1 of the FET 37 gradually increases. During an on-time period 101 in which the control signal Vp is set to a high level (the FET 25 is turned on), the gate voltage Vg1 of the FET 37 increases. Also, during an off-time period 103 in which the control signal Vp is set to a low level (the FET 25 is turned off), the gate voltage Vg1 decreases.

During the on-time period 101, since the diode D6 is applied with a forward bias, the delay circuit 39 is applied with a voltage corresponding to the control signal Vp of high level. Therefore, an amount of increase (an amount of change) in the gate voltage Vg1 during the on-time period 101 becomes a value corresponding to a time constant to be determined by the resistance value of the delay resistance element Rd1 and the electrostatic capacity of the delay capacitor Cd1.

Also, during the off-time period 103, since the diode D6 is applied with a reverse bias, the charges accumulated in the delay capacitor Cd1 are discharged to the ground through the delay resistance element Rd2, like during the output stop mode. Therefore, an amount of decrease (an amount of change) in the gate voltage Vg1 during the off-time period 103 becomes a value corresponding to a time constant to be determined by the resistance value of the delay resistance element Rd2 and the electrostatic capacity of the delay capacitor Cd1. The amount of decrease (the time constant) in the gate voltage Vg1 is similar to that upon start of the shift to the output stop mode, as described above.

As shown in FIG. 6, in the first illustrative embodiment, the amount of change (the amount of decrease) in the gate voltage Vg1 of the FET 37 (the second switching element) during the off-time period 103 is smaller than the amount of change (the amount of increase) in the gate voltage Vg1 during the on-time period 101. In other words, in order to meet this relation, the resistance value of the delay circuit 39 is set so that the time constant during the on-time period 101 is small and the time constant during the off-time period 103 is large. Specifically, the resistance value of the delay resistance element Rd1 is set smaller than the resistance value of the delay resistance element Rd2. As a result, as shown in FIG. 6, the gate voltage Vg1 gradually increases after the start of the output mode. The gate voltage Vg1 gradually increases by a difference between the amount of increase during the on-time period 101 and the amount of decrease during the off-time period 103 by repeating the on-and-off states of the control signal Vp. Thereby, the smoothing capacitor C1 is not immediately connected to the AC power supply 15 after the start of the output mode and is gradually connected to the AC power supply 15 in association with the connection of the FET 37, and the inrush current is thus suppressed.

In the meantime, it is possible to diversely change the amount of change in the gate voltage Vg1 by executing the processing of the soft start circuit 55 of the control IC 50, in addition to the setting of the time constant of the delay circuit 39. For example, upon the shift from the output stop mode to the output mode, the soft start circuit 55 may be driven, and the gate voltage Vg1 may be increased more gently. Also, for example, upon the shift from the output mode to the output stop mode, the soft start circuit 55 may be stopped, and the amount of decrease in the gate voltage Vg1 may be increased, as compared to the amount of change (the amount of increase) upon the shift to the output mode. Thereby, it is possible to shorten a time period after the output stop mode is started until the FET 37 is turned off, as compared to a time period after the output mode is started until the FET 37 is turned on. That is, upon the shift to the output stop mode, it is possible to more rapidly turn the FET 37 off.

Also, as described above, when the control signal Vp is stopped in association with the shift from the output mode to the output stop mode, the gate voltage Vg1 of the FET 37 is gradually decreased. When the gate voltage Vg1 becomes the threshold Vth or smaller, the FET 37 is turned off. The smoothing capacitor C1 is disconnected. For this reason, during the output stop mode, the power consumption is suppressed.

In the first illustrative embodiment, the printer 1 is an example of the image forming apparatus. The AC power supply 15 is an example of the main power supply. The FET 25 is an example of the first switching element. The FET 37 is an example of the second switching element. The control IC 50 is an example of the switch controller.

5. Effects

According to the first illustrative embodiment, it is possible to accomplish following effects.

The smoothing capacitor C1 of the rectifying-and-smoothing circuit 27 is connected in series with the FET 37 (the second switching element). The FET 37 is switched between the on-and-off states of energization by the control signal Vp output from the control IC 50 (the switch controller). The control IC 50 is configured to limit the on-time period of the FET 37 during the output stop mode in which the oscillation of the transformer 23 is stopped. For this reason, during the output stop mode, the FET 37 is temporarily turned off, consecutively turned off or continuously turned off. The FET 37 is turned off, so that the low voltage-side of the smoothing capacitor C1 is disconnected. Thereby, during the output stop mode, the smoothing capacitor C1 is not applied with the voltage from the AC power supply 15 (the main power supply), so that it is possible to suppress the generation of leak current and the power consumption.

Figure 8:
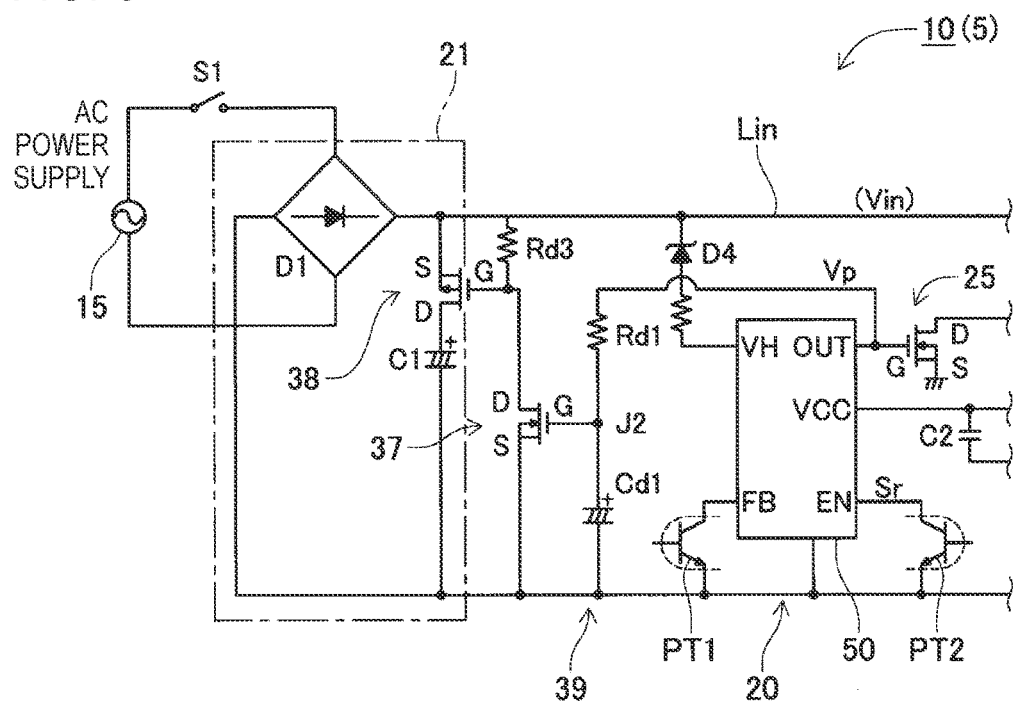
FIG. 8 is a circuit diagram of the switching power supply of a third illustrative embodiment.

Also, the FET 37 is connected to the low voltage-side of the smoothing capacitor C1. In this case, it is possible to simplify the circuit of the switching power supply 20, as compared to a configuration (refer to FIG. 8) in which the FET 37 is connected to the high voltage-side of the smoothing capacitor C1.

6. Second Illustrative Embodiment

Figure 7:
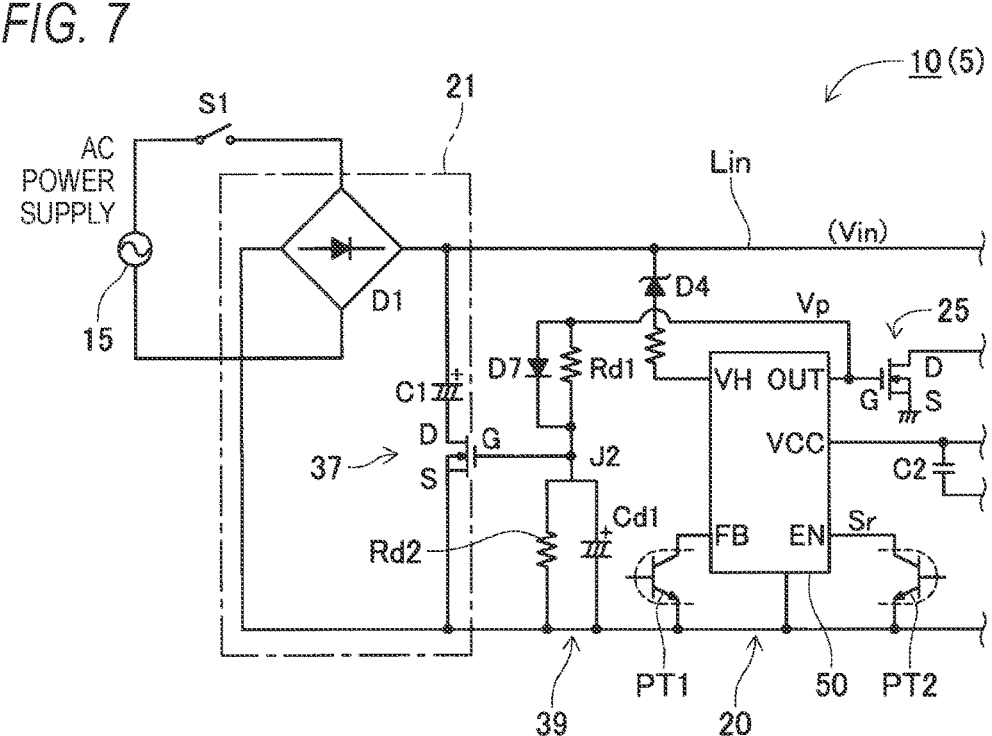
FIG. 7 is a circuit diagram of the switching power supply of a second illustrative embodiment.

In the meantime, the circuit configuration of the delay circuit 39 of the first illustrative embodiment is an example and can be appropriately changed. For example, like the switching power supply 20 of a second illustrative embodiment shown in FIG. 7, the diode D6 (refer to FIG. 2) connected in series with the delay resistance element Rd1 may be omitted, and a diode D7 may be connected in parallel. In this configuration, during the on-time period 101 (refer to FIG. 6) of the control signal Vp, the diode D7 is applied with a forward bias. The gate voltage Vg1 increases, in correspondence to a time constant to be determined by the electrostatic capacity of the delay capacitor Cd1. On the other hand, during the off-time period 103, the diode D7 is applied with a reverse bias. The gate voltage Vg1 decreases, in correspondence to a time constant to be determined by the electrostatic capacity of the delay capacitor Cd1, the resistance value of the delay resistance element Rd1, and the resistance value of the delay resistance element Rd2. Therefore, the gate voltage Vg1 changes in different amounts of change during the on-time period 101 and during the off-time period 103. Thereby, it is possible to gradually increase the gate voltage Vg1 upon the shift from the output stop mode to the output mode.

7. Third Illustrative Embodiment

Subsequently, the switching power supply 20 of a third illustrative embodiment is described. In the switching power supply 20 of the third illustrative embodiment, a FET 38 is connected to the high voltage-side of the smoothing capacitor C1, unlike the first illustrative embodiment.

The FET 38 is a P-channel MOSFET, and a source S thereof is connected to the input line Lin and a drain D thereof is connected to the smoothing capacitor C1. A gate G of the FET 38 is connected to a delay resistance element Rd3 and the drain D of the FET 37. The delay resistance element Rd3 is connected between the input line Lin and the gate G of the FET 38.

Also, the FET 37 of the third illustrative embodiment is not directly connected to the smoothing capacitor C1, and the drain D thereof is connected to the gate G of the FET 38, and the source S thereof is earthed. The gate G of the FET 37 is connected to the output port OUT of the control IC 50 via the delay resistance element Rd1. Also, the gate G of the FET 37 is earthed via the delay capacitor Cd1.

In the above configuration, when the control signal Vp is output from the output port OUT during the output mode, the FET 37 is turned on. When the FET 37 is turned on and the gate G of the FET 38 is set to the low level, the FET 38 is turned on. Therefore, during the output mode, the smoothing capacitor C1 is connected to the AC power supply 15 and the AC voltage is smoothed.

On the other hand, during the output stop mode, when the control signal Vp from the output port OUT is stopped, the FET 37 is turned off. Accompanied by this, the FET 38 is turned off. Therefore, during the output stop mode, the connection of the smoothing capacitor C1 with the AC power supply 15 of the high voltage-side is disconnected. Thereby, during the output stop mode, it is possible to suppress the power consumption.

8. Fourth Illustrative Embodiment

Subsequently, the switching power supply 20 of a fourth illustrative embodiment is described. In the first illustrative embodiment, the switching power supply 20 is configured to drive the FET 37 by the control signal Vp that is to be output from the output port OUT and is to drive the FET 25. In contrast, the control IC 50 of the fourth illustrative embodiment shown in FIG. 9 includes an output port for gate GP for outputting a control signal Vp2 for driving the FET 37, separately from the output port OUT. The output port for gate GP is connected to the gate G of the FET 37. Therefore, the control IC 50 of the fourth illustrative embodiment separately includes the output port OUT (the first output port) connected to the FET 25 (the first switching element) and the output port for gate GP (the second output port) connected to the FET 37 and provided to output the control signal Vp2.

For this reason, the control IC 50 can separately control (turn on/off) the FET 25 and the FET 37 by outputting the different signals (the control signals Vp, Vp2) from the output port OUT and the output port for gate GP. For example, the control IC 50 may be configured to start the on-control of the FET 25 after starting the on-control of the FET 37, as the switching power supply shifts from the output stop mode to the output mode.

Figure 10:
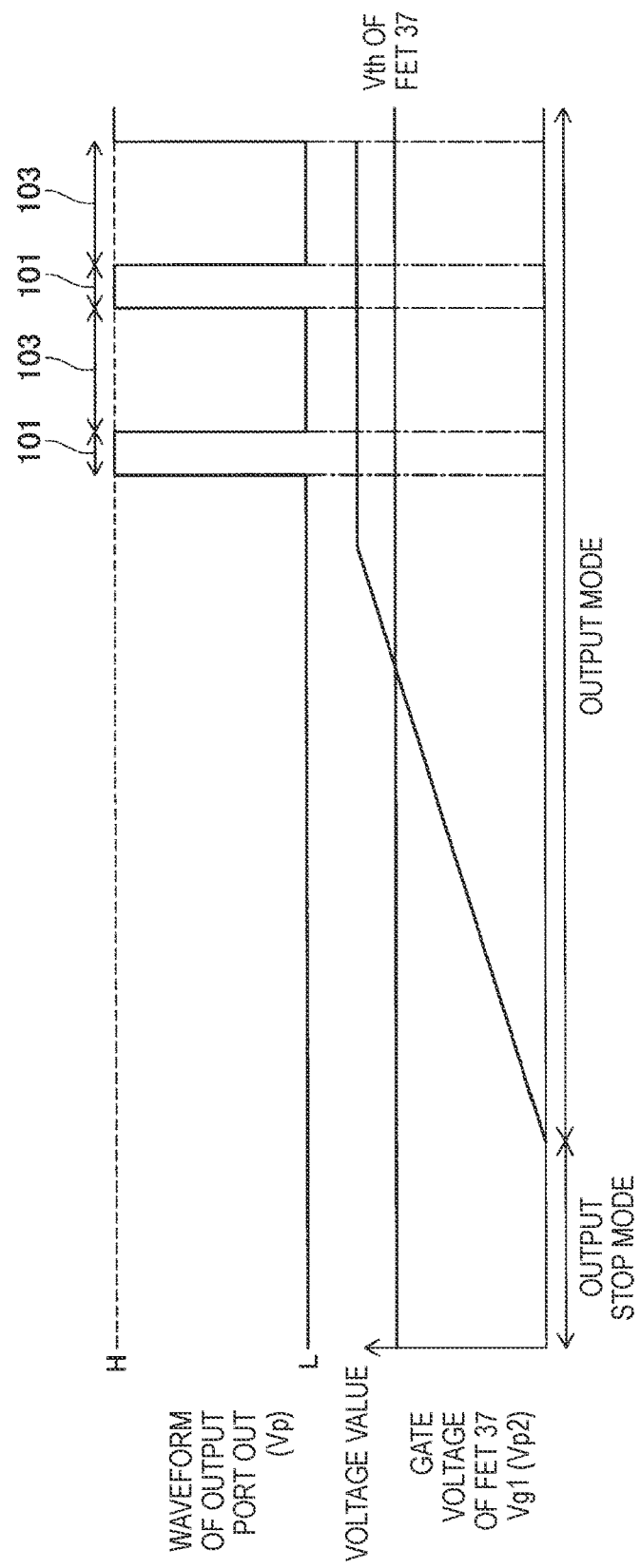
FIG. 10 is a waveform diagram depicting a relation between the control signal and the gate voltage in the fourth illustrative embodiment.

As shown in FIG. 10, the control IC 50 gradually increases the control signal Vp2 (the gate voltage Vg1) to the threshold Vth or greater, as the output mode starts. In the meantime, the control IC 50 may be configured to output the control signal Vp2 having a voltage value (a constant value) equal to or greater than the threshold Vth simultaneously with the start of the output mode and to turn on the FET 37 simultaneously with the start of the output mode, without gradually increasing the control signal Vp2.

Figure 9:
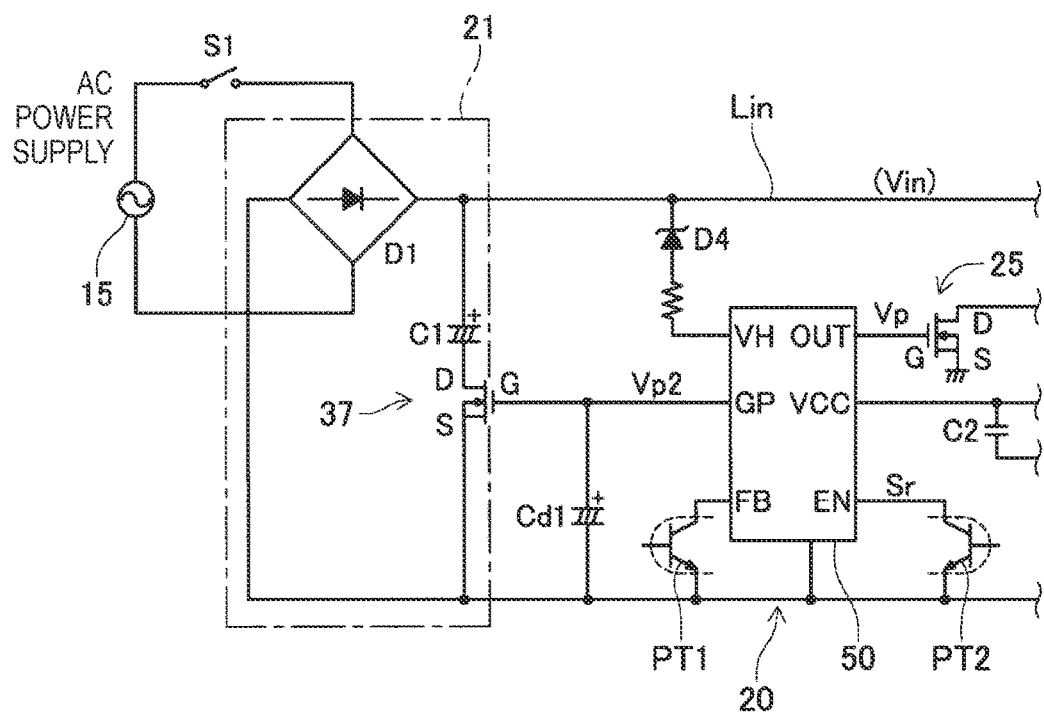
FIG. 9 is a circuit diagram of the switching power supply of a fourth illustrative embodiment.

Alternatively, as shown in FIG. 9, the delay capacitor Cd1 may be connected between the gate G of the FET 37 and the ground. In this configuration, when the control signal Vp2 having a voltage value (a constant value) equal to or greater than the threshold Vth is output from the control IC 50, it is possible to gradually increase the gate voltage Vg1 of the FET 37 by the delay capacitor Cd1.

In the fourth illustrative embodiment, the output port OUT is an example of the first output port. The output port for gate GP is an example of the second output port.

9. Effects

According to the fourth illustrative embodiment, it is possible to accomplish following effects.

The control IC 50 separately includes the output port OUT (the first output port) connected to the FET 25 (the first switching element) and the output port for gate GP (the second output port) connected to the FET 37 and provided to output the control signal Vp2.

According to the above configuration, the control IC 50 can separately control (turn on/off) the FET 25 and the FET 37 by outputting the different signals from the output port OUT and the output port for gate GP. Thereby, the control IC 50 can turn on/off the FET 37 at optimal timing without being limited to timing at which the FET 25 is turned on/off, so that it is possible to more securely suppress the generation of leak current.

Also, the control signal Vp2 is a pulse signal. The delay capacitor Cd1 has one terminal connected to the output port for gate GP and the gate G of the FET 37, and the other terminal connected to the low voltage source.

According to the above configuration, the delay capacitor Cd1 is gradually charged by the pulse signal (the control signal Vp2), so that it is possible to gradually increase the gate voltage of the FET 37.

10. Modified Embodiments

In the meantime, this disclosure is not limited to the above illustrative embodiments, and can be diversely changed and improved on the basis of the knowledge of one skilled in the art.

Figure 11:
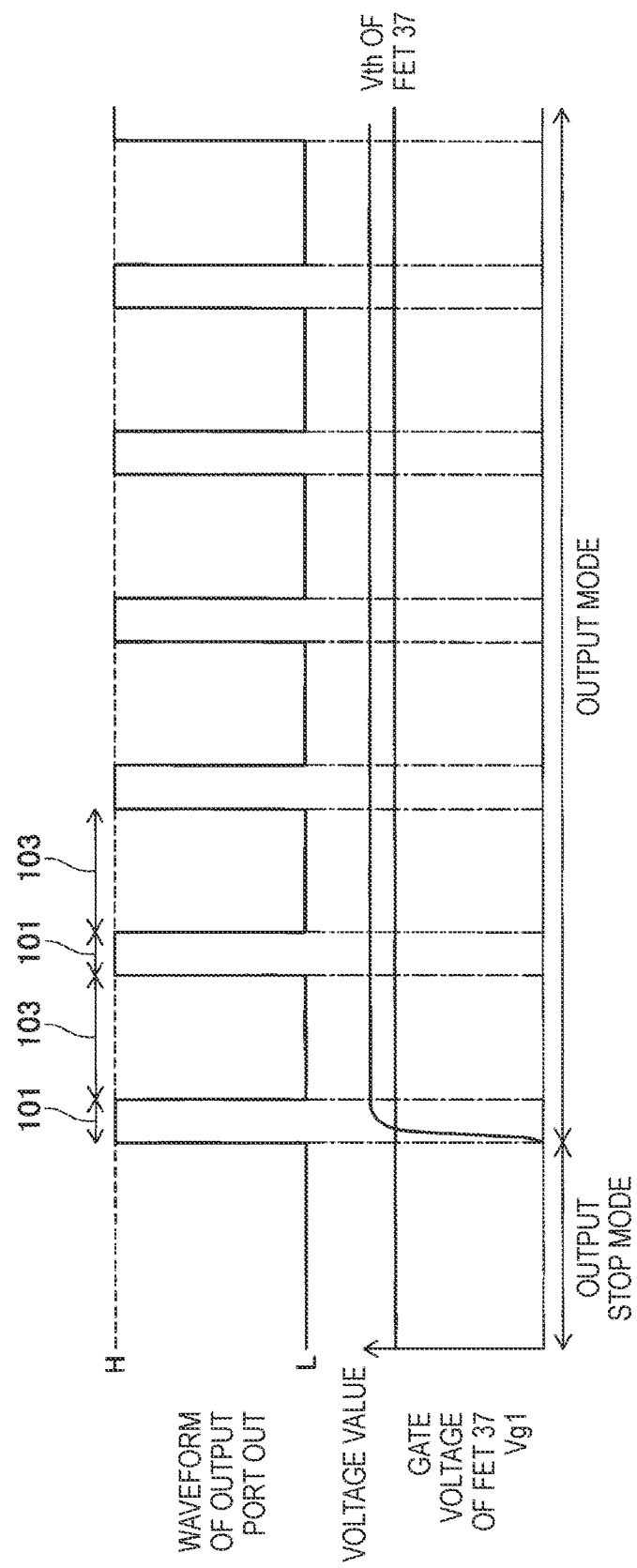
FIG. 11 is a waveform diagram depicting a relation between the control signal and the gate voltage in another example.

For example, in the first illustrative embodiment, the gate voltage Vg1 of the FET 37 is gradually increased via the plurality of the on-time periods 101 so as to excess the threshold Vth. However, this disclosure is not limited thereto. For example, as shown in FIG. 11, the gate voltage Vg1 may excess the threshold Vth, i.e., the FET 37 may be turned on for one on-time period 101. For example, this configuration can be implemented by making the resistance value of the delay resistance element Rd1 extremely smaller than the resistance value of the delay resistance element Rd2. In this case, the resistance value of the delay resistance element Rd2 is made large, so that the charges of the delay capacitor Cd1 are difficult to be discharged and the gate voltage Vg1 can be rapidly increased during the off-time period 103.

Also, in the above illustrative embodiments, one of the high voltage-side and the low voltage-side of the smoothing capacitor C1 is disconnected. However, both may be disconnected.

Also, in the above illustrative embodiments, the FET 37 (the N-channel MOSFET) has been adopted as the second switching element of this disclosure. However, this disclosure is not limited thereto. For example, the second switching element of this disclosure may also be a junction-type FET, a bipolar transistor, an IGBT, or an element (for example, a relay) except for a semiconductor element capable of disconnecting the current path.

What is claimed is:

1. A switching power supply comprising:
a main power supply;
a rectifying-and-smoothing circuit configured to rectify an AC voltage supplying from the main power supply, and to smooth the rectified AC voltage by a smoothing capacitor;
a transformer connected to the rectifying-and-smoothing circuit;
a first switching element connected to a primary coil of the transformer;
a switch controller configured to perform switching-control the first switching element to oscillate the primary side of the transformer, thereby inducing a voltage to a secondary side of the transformer; and
a second switching element connected in series with the smoothing capacitor of the rectifying-and-smoothing circuit and configured to switch between on-and-off states of energization by a control signal that is to be output from the switch controller,
wherein the switch controller is configured to limit an on-time period of the second switching element by the control signal during an output stop mode in which the oscillation of the transformer is to be stopped.

2. The switching power supply according to claim 1,
wherein the second switching element is a field effect transistor, and
wherein the control signal is supplied to a gate of field effect transistor from the switch controller so that the on-and-off states thereof are switched.

3. The switching power supply according to claim 2,
wherein the second switching element is an N-channel field effect transistor and is connected to a low voltage-side of the smoothing capacitor.

4. The switching power supply according to claim 1,
wherein the switch controller is configured to keep the off state of the second switching element during the output stop mode.

5. The switching power supply according to claim 1,
wherein the first switching element and the second switching element are field effect transistors,
wherein gates of the first switching element and the second switching element are connected to an output port of the switch controller and are supplied with the control signal, and
wherein the switching power supply further includes a delay circuit configured to suppress an amount of change in gate voltage of the second switching element during an off-time period of the first switching element, as compared to an amount of change in gate voltage of the second switching element during an on-time period of the first switching element.

6. The switching power supply according to claim 5,
wherein the delay circuit includes a delay resistance element and a delay capacitor connected to the gate of the second switching element.

7. The switching power supply according to claim 6,
wherein the delay circuit further includes a diode connected to the gate of the second switching element, and
wherein the diode is connected between the delay resistance element and the delay capacitor and is configured to make a time constant of the delay circuit during the on-time period of the first switching element smaller than a time constant of the delay circuit during the off-time period of the first switching element.

8. The switching power supply according to claim 5,
wherein the switch controller is configured to start a switching control of the first switching element, as the switching power supply shifts from the output stop mode to an output mode in which the transformer is to be oscillated, and wherein after the shift to the output mode, the delay circuit is configured to suppress the amount of change in gate voltage so that, after repeating the on-time period of the first switching element, a gate voltage of the second switching element excesses a threshold.

9. The switching power supply according to claim 1, wherein the switch controller separately includes:

a first output port connected to the first switching element; and a second output port connected to the second switching element and provided to output the control signal.

10. The switching power supply according to claim 9, wherein the switch controller is configured to start an on-control of the first switching element after starting an on-control of the second switching element, as the switching power supply shifts from the output stop mode to an output mode in which the transformer is to be oscillated.

11. The switching power supply according to claim 9, wherein the second switching element is a field effect transistor, and wherein the switch controller is configured to gradually change a gate voltage of the second switching element by using the control signal to be output from the second output port, as the switching power supply shifts from the output stop mode to an output mode in which the transformer is to be oscillated.

12. An image forming apparatus comprising:

a switching power supply including:

a main power supply;

a rectifying-and-smoothing circuit configured to rectify an AC voltage, which is supplied from the main power supply, and to smooth the rectified AC voltage by a smoothing capacitor;

a transformer connected to the rectifying-and-smoothing circuit;

a first switching element connected to a primary coil of the transformer;

a switch controller configured to perform switching-control the first switching element to oscillate the primary side of the transformer, thereby inducing a voltage to a secondary side of the transformer; and a second switching element connected in series with the smoothing capacitor of the rectifying-and-smoothing circuit and configured to switch between on-and-off states of energization by a control signal that is to be output from the switch controller; and an image forming unit configured to drive by power supplied from the switching power supply and to form an image, wherein the switch controller is configured to limit an on-time period of the second switching element by the control signal during an output stop mode in which the oscillation of the transformer is to be stopped.

\* \* \* \* \*